United States Patent [19]

Berger et al.

[11] 4,089,775

[45] May 16, 1978

[54] LOW POUR MIDDLE DISTILLATES FROM WIDE-CUT PETROLEUM FRACTIONS

[75] Inventors: Dietmar Berger, Wyoming; Jackson Eng, Sarnia, both of Canada

[73] Assignee: Exxon Research & Engineering Co., Linden, N.J.

[21] Appl. No.: 754,242

[22] Filed: Dec. 27, 1976

[51] Int. Cl.² .................. C10G 13/02; C10G 23/02
[52] U.S. Cl. .................. 208/111; 208/216; 208/217
[58] Field of Search .................. 208/216, 111, 217

[56] References Cited

U.S. PATENT DOCUMENTS

| | | | |
|---|---|---|---|
| 3,730,878 | 5/1973 | Pollitzer | 208/216 |
| 3,804,742 | 4/1974 | Bennett et al. | 208/111 |
| 3,849,292 | 11/1974 | Gleim | 208/216 |
| 3,861,005 | 1/1975 | Steinmetz et al. | 208/111 |
| 3,926,780 | 12/1975 | Ward | 208/216 |

*Primary Examiner*—George Crasanakis
*Attorney, Agent, or Firm*—Edward M. Corcoran

[57] ABSTRACT

A process for simultaneously desulfurizing and dewaxing raw, untreated, high sulfur-containing wide-cut petroleum oil fractions to produce desulfurized middle distillate oils of low pour point with a minimum cracking of the raw fraction to gases which comprises contacting the raw fraction with hydrogen and a catalyst comprising a hydrogenating component and faujasite on an amorphous support. A particularly preferred catalyst consists of 95 wt.% based on total catalyst of NiO/MoO$_3$ on an amorphous silica/alumina support and 5 wt.% of nickel-exchanged faujasite.

19 Claims, No Drawings

LOW POUR MIDDLE DISTILLATES FROM WIDE-CUT PETROLEUM FRACTIONS

BACKGROUND OF THE INVENTION

1. Field of the Invention

This invention relates to a process for upgrading raw, sulfur-containing petroleum fractions. More particularly, this invention relates to a process for simultaneously desulfurizing and dewaxing an untreated, wide-cut petroleum distillate by contacting same, in the presence of hydrogen, with a catalyst comprising a hydrogenating metal component and faujasite on an amorphous silica/alumina support, with a minimum cracking of feed to gas to obtain a middle distillate product of reduced sulfur and wax content and in an amount at least equal to that in the feed.

2. Description of the Prior Art

Middle distillate petroleum oil fractions boiling in the range of between 300° and 650° F are well known and widely used for various fuels such as kerosene, diesel fuels, domestic heating oils, and jet fuels. However, before these fractions can be used they must be treated to remove sulfur and other impurities along with some of the waxy, normal paraffins normally present therein. The presence of waxy, normal paraffinic materials has an adverse effect on the pour point and cloud point of these various oils and fuel fractions. In the past, sulfur and other impurities have been removed by passing the feed over well known catalysts such as cobalt molybdate on alumina, in the presence of hydrogen, with the wax being subsequently removed via one of the various solvent dewaxing processes employing dewaxing solvents such as autorefrigerants, ketones, aromatics and mixtures thereof.

Catalytic dewaxing has been suggested for removing at least a portion of the wax from middle distillates and thereby lowering the pour point thereof. U.S. Pat. No. 3,294,858 teaches the use of zeolites having a uniform pore size of 5A, such as analcite and chabasite, for catalytically hydrodewaxing middle distillates. However, this patent does not suggest the use of a metal hydrogenating component with the zeolite and, further, the catalysts disclosed therein deactivate very rapidly due to coking or carbon deposition thereon. U.S. Pat. No. 3,876,525 discloses the use of a noble metal supported by decationized or H-mordenite having a silica/alumina ratio of from 10/1 to 15/1 for catalytically dewaxing middle distillate fractions. Unfortunately, a catalyst comprising one or more noble metals on mordenite cannot tolerate raw, unrefined feeds. The feed must first be reduced in metals, sulfur and nitrogen compounds before coming into contact with the mordenite or the mordenite will deactivate very rapidly.

Therefore, notwithstanding the fact that it is now possible to catalytically dewax various petroleum oil fractions, it is still necessary to remove sulfur and other impurities therefrom in order to obtain useful products and in order to have a useful catalyst life. Further, the ever increasing demand for these middle distillate fuel oil fractions has prompted the petroleum industry to find new methods of obtaining same from higher boiling fractions. For example, U.S. Pat. No. 3,268,436 discloses hydrocracking a paraffin wax feed boiling above 650° F down into a jet fuel boiling within the range of 50°]F to 550° F using two catalytic zones, a cracking zone using palladium on faujasite followed by a hydrogenation zone. U.S. Pat. No. 3,617,486 discloses the use of a catalyst comprising either a noble metal or mixed non-noble metals on faujasite to hydrocrack heavy naphtha down into gasoline boiling fractions. U.S. Pat. No. 3,503,871 discloses a hydrocracking catalyst comprising a noble metal on a large pore zeolitic cracking base, including faujasite, for hydrocracking hydrocarbon streams such as naphtha fractions down to obtain products boiling in the gasoline range. This patent discloses that faujasite is a better cracking base than alumina.

It would be a significant improvement to the art if one could obtain middle distillates from raw, wide-cut petroleum fractions and simultaneously lower the pour point and remove the sulfur and other impurities therefrom.

SUMMARY OF THE INVENTION

According to the present invention, a process has now been discovered for simultaneously desulfurizing and dewaxing a raw, high sulfur-containing, wide-cut petroleum fraction feed which comprises contacting said feed and hydrogen in a hydroconversion zone with a catalyst comprising a hydrogenating component and faujasite on an amorphous silica/alumina support under mild hydrocracking conditions to produce a low pour point middle distillate having a sulfur and wax content lower than that of said feed.

Catalysts useful in this invention are low sieve-content catalysts comprising a mixture of a major amount of an amorphous component and minor amounts of (1) faujasite and (2) a hydrogenation component comprising one or more transitional metals selected from Groups VIB and/or VIII of the Periodic Table and the oxides and sulfides thereof.

The amorphous component or support can be one or more of a large number of non-crystalline materials, preferably inorganic in nature and having high porosity. Representative materials include sintered glass, firebrick, diatomaceous earth, alumina, silica/alumina, zirconia, silica, magnesia, titania and the like and mixtures thereof. A particularly preferred support is silica/alumina wherein the silica/alumina weight ratio ranges from 20/1 to 1/20 and preferably from 1/4 to 1/6.

The amount of faujasite in the catalyst should be less than about 9 wt.% and more preferably less than about 5 wt.% of the total catalyst. The amount of faujasite in the catalyst based on the dry weight of the support will range from about 0.5 to 30 wt.% and more preferably from about 1 to 10 wt.%. Natural faujasite and synthetic faujasite are suitable, with synthetic faujasite being most preferred. U.S. Pat. No. 3,130,007, the disclosures of which are incorporated herein by reference, teaches the preparation of synthetic faujasite. Particularly preferred is a nickel-exchanged faujasite. U.S. Pat. No. 3,236,762, the disclosures of which are incorporated herein by reference, teaches how to introduce various metals into a faujasite sieve, including introducing nickel via cation exchange.

As previously mentioned, the hydrogenating component preferably comprises one or more transitional metals selected from Groups VIB and/or VIII of the Periodic Table and the oxides and sulfides thereof. Representative of these metals are molybdenum, nickel, chromium, tungsten, cobalt, palladium, iron, rhodium, platinum and the like, as well as combinations of these metals and/or their oxides and/or sulfides. One or more of the metals, metal oxides or sulfides, alone or in combination will be added to the catalyst support in minor proportions ranging from about 0.5 to 25 wt.% of the total (dry basis) catalyst. The catalyst will typically contain from about 1 to 20 wt.%, preferably from 5 to 15 wt.% (as the oxide) of a Group VIB metal and from about 0.1 to 10 wt.% (as the oxide) of a Group VIII metal based on the total catalyst. Nickel oxide or sulfide is a preferred hydrogenation component. Particularly preferred is a mixture of nickel and molybdenum oxides present in the following amounts: from about 0.1 to 10 wt.%, more preferably from 1 to 5 wt.% of nickel oxide and from about 1 to 20 wt.%, more preferably from 5 to 15 wt.% of molybdenum oxide based on the total weight (dry basis) of the catalyst.

The catalyst may be prepared by any of the general and well known methods described in the art. An illustrative, but non-limiting example is to impregnate the silica/alumina support with nickel and molybdenum, form a slurry of the impregnated support and mix the faujasite into the slurry which is then extruded and dried. The catalyst is preferably presulfided by conventional methods, such as by treatment with hydrogen sulfide or carbon disulfide, prior to use.

Part of the present invention is the use of mild hydrocracking conditions in conjunction with the catalyst in order to produce useful middle distillate fractions from raw, untreated wide-cut feeds, in a yield equal to or greater than the amount of middle distillate fraction originally present in said feed, while simultaneously desulfurizing and lowering the pour point thereof with a minimum cracking of feed to gaseous products. Therefore, whereas normal hydrocracking conditions call for temperatures ranging from about 700° to 850° F at hydrogen pressures ranging between 1,500 to 4,000 psig, the mild hydrocracking conditions of the instant invention call for temperatures ranging from about 650° to 800° F at hydrogen pressures of from about 750 to 2,000 psig, more preferably from 1,000 to 2,000 psig and at liquid hourly space velocities ranging from about one-half to two and one-half liquid volumes per volume per hour.

Feed stocks used in the instant invention are relatively high sulfur-containing, untreated, wide-cut distillate fractions such as virgin gas oils and gas oils from catalytic cracking having a boiling range of from about 200° to 900° F and, more preferably from about 400° to about 750° F. By untreated is meant a fraction that has not been treated for the removal of sulfur, metals, aromatics or wax prior to being contacted with the catalyst and hydrogen. Thus, where the feed is a virgin gas oil, heating oil or other fraction boiling within the range of 200° to 900° F at atmospheric pressure, the feed will be taken directly from a crude oil vacuum or atmospheric pipe still and passed directly to a hydroconversion zone wherein it is contacted with the catalyst and hydrogen. High sulfur means that the feed stock contains from about one-half to 2 wt.% of sulfur, but more preferably from about ½ to 1½ wt.% sulfur. The untreated gas oil from catalytic cracking also is not treated for removal of sulfur and aromatics and is taken from the fractionator and passed directly to the hydroconversion zone. The middle distillate produced will preferably have a sulfur content of less than 0.1 wt.% and a pour point of less than 5° F.

DESCRIPTION OF THE PREFERRED EMBODIMENTS

The following examples further illustrate the present invention. Unless otherwise specified, all percentages and parts are by weight.

EXAMPLE 1

Experiments were conducted to determine the dewaxing effect, if any, of various catalysts on two different, sulfur-containing untreated feeds; a heavy atmospheric gas oil (HAGO) and a heavy catalytic heating oil (HCHO) whose properties are in Table 1. The experiments were run by passing each feed over a fixed bed of catalyst at a temperature of 750° F, total pressure of 1,000 psig, hydrogen partial pressure of 1,000 psig, liquid hourly space velocity of feed of 1 and a hydrogen flow rate of 5,000 SCF per barrel of feed. The results are listed in Table 2.

Best results were obtained using faujasite and Ni-Mo on $SiO_2/Al_2O_3$. The Ni-Mo on faujasite was not as active for pour point reduction as was the faujasite and Ni-Mo on $SiO_2/Al_2O_3$.

The Ni on H-mordenite was unsuitable because the raw feeds deactivated it in less than an hour.

EXAMPLE 2

This experiment was run to determine the desulfurizing and dewaxing effect of the catalyst on the middle distillate product of the raw HCHO feed. Operating conditions were identical to those listed in Example 1. The catalyst used was the Ni-Mo and faujasite on $SiO_2/Al_2O_3$ shown in Table 2. The results of this experiment are set forth in Table 3 and show that not only was the middle distillate (300° to 625° F) product desulfurized and dewaxed to a pour point of −5° F, but that the amount of middle distillate produced was almost double the amount initially present in the feed.

TABLE 1

| FEED PROPERTIES* | | |
|---|---|---|
| | HCHO | HAGO |
| Gravity, ° API | 15.6 | 31.6 |
| Pour Point, ° F | +50 | +35 |
| Sulfur, wt.% | 1.6 | 0.3 |
| Aromatics, LV% | 73 | 24 |
| Olefins, LV% | 2 | 4 |
| Saturates, LV% | 25 | 72 |
| IBP, ° F | 445 | 464 |
| FBP, ° F | 682 | 680 |

Note:
*Aromatics, olefins and unsaturates determined by ASTM D-1319. Initial and final boiling points determined per ASTM D-86.

TABLE 2

| CATALYST COMPARISON ON POUR POINT REDUCTION | | | |
|---|---|---|---|
| Catalyst* | | Pour Point (° F) on Total Product from** | |
| Metals | Base | HAGO | HCHO |
| 3 Co + 12 Mo | 15 $SiO_2$ + 85 $Al_2O_3$ | 35 | 50 |
| 6 Ni + 19 W | $SiO_2$ + $Al_2O_3$ | 35 | 45 to 50 |
| 5 Ni | Faujasite | 35 | 45 |
| 0.5 Pt | H-Mordenite | 35 | 50 |
| 4 Ni + 16 Mo | 3 $SiO_2$ + 92 $Al_2O_3$ + 5 Faujasite | 20 | 35 to 40 |
| 2 Ni + 10 Mo | Faujasite | 25 to 30 | 45 |
| 5 Ni | H-Mordenite*** | 30 | 50 |

NOTES:
*Data shown are as percent weight. Amount of metal is based on weight of total catalyst. Metals expressed as weight of metal oxide.
**Feed pour points are HAGO +35° F and HCHO +50° F.
***Deactivated after one hour.

TABLE 3

PRODUCT DISTRIBUTION FROM TREATING TOTAL HCHO

| | Total HCHO | Total Product | 1-300 Feed | 1-300 Product | 300-625 Feed | 300-625 Product | 625+ Feed | 625+ Product |
|---|---|---|---|---|---|---|---|---|
| LV% on Feed | — | — | — | 7.4 | 28.6 | 57.4 | 71.4 | 35.2 |
| Gravity, °API | — | — | — | 46.3 | 18.3 | 22.3 | 14.3 | 30.6 |
| Pour Point, °F | — | — | — | — | 25 | −5 | 60 | 70 |
| Cloud Point, °F | — | — | — | — | 54 | 14 | — | — |
| Sulfur, wt.% | 1.6 | 0.09 | — | 10 ppm | 0.96 | <0.05 | 1.8 | 0.2 |

EXAMPLE 3

This example compares the middle distillate product obtained from the wide-cut heavy catalytic heating oil feed shown in Table 1 as a function of processing sequence. Process conditions were the same as those given for Example 1 and the catalyst was the Ni-Mo-faujasite on $SiO_2/Al_2O_3$ shown in Table 2 and used in Example 2. The results are listed in Table 4 and show that the process of the instant invention not only handles high sulfur feeds, but it produces low pour middle distillate fractions at a yield equal to or greater than that present in the feed and greater than the yield one would get by fractionating the feed, hydroconverting the 625+° F cut, fractionating the hydroconverted product obtained therefrom and combining the two 300° to 625° F cuts.

TABLE 4

COMPARISON OF 300 to 625° F FRACTIONS FROM DIFFERENT PROCESSING SEQUENCES

Sequence "A": Hydroconversion of wide cut HCHO, fractionation of product.
Sequence "B": Fractionation, hydroconversion of 625° F+ cut and fractionation of product, blending the two 300 to 625° F cuts.

| Processing Sequence | LV% On Feed | Gravity, °API | Pour Point, °F | Sulfur Wt.% S |
|---|---|---|---|---|
| "A" | 57.4 | 22.3 | −5 | Nil |
| "B" | 64.1 | 16.8 | +20 | 0.57 |

What is claimed is:

1. A process for simultaneously desulfurizing and dewaxing a raw, untreated, high sulfur-containing, wide-cut petroleum oil feed containing a middle distillate fraction which comprises contacting said feed and hydrogen with a catalyst comprising a hydrogenating component on a mixture of faujasite and amorphous silica/alumina support, said hydrogenating component comprising a metal oxide or metal sulfide of a Group VI-B metal, Group VIII metal or mixture thereof wherein the amount of faujasite in said mixture is from about 0.5 to 30 wt.% said contacting being carried out under mild hydrocracking conditions including a temperature within the range of from about 650° to 850° F and a hydrogen partial pressure ranging between from about 750 to 2,000 psig to produce a low pour point middle distillate fraction product in an amount at least equal to the amount of said fraction present in said feed and having a sulfur and wax content lower than said middle distillate fraction of said feed.

2. The process of claim 1 wherein said feed is a fraction boiling within the range of from 200° to 900° F.

3. The process of claim 2 wherein said middle distillate fraction product boils within the range of from about 300° to 625° F.

4. The process of claim 3 wherein said mild hydrocracking conditions include a hydrogen partial pressure ranging between 1000 to 2,000 psig and a liquid hourly space velocity ranging between ½ to 2½.

5. The process of claim 4 wherein the amount of faujasite in said mixture ranges from about 1 to 10 wt.%.

6. The process of claim 5 wherein said feed contains at least ½ wt.% sulfur.

7. The process of claim 5 wherein the amount of said hydrogenating component on said catalyst ranges from 0.25 to 25 wt.% of said catalyst.

8. The process of claim 6 wherein said hydrogenating component consists essentially of a metal selected from Group VI-B and a metal selected from Group VIII.

9. The process of claim 7 wherein said hydrogenating component is a mixture of molybdenum and nickel.

10. The process of claim 9 wherein said middle distillate product has a sulfur content of less than 0.1 wt.% and a pour point of less than 5° F.

11. A process for simultaneously desulfurizing and hydrodewaxing an untreated, high sulfur-containing wide-cut petroleum distillate feed stock boiling in the range of 200° to 900° F and containing a middle distillate fraction which comprises contacting said untreated feed and hydrogen with a catalyst containing at least one metal hydrogenating component selected from the group consisting of Group VIB metals, Group VIII metals and mixtures thereof on a mixture of faujasite and an amorphous $SiO_2/Al_2O_3$ support, wherein the amount of faujasite in said mixture is from about 0.5 to 30 wt.%, said contacting being carried out under mild hydrocracking conditions including a temperature within the range of from 650° to 850° F and a hydrogen partial pressure between 750 and 2,000 psig to produce a middle distillate product boiling in the range of from about 300° to 625° F in an amount at least equal to the amount of said fraction present in said feed and having a sulfur content, wax content and pour point lower than said middle distillate fraction of said feed.

12. The process of claim 11 wherein said feed contains at least about ½ to 2 wt.% sulfur.

13. The process of claim 12 wherein the amount of faujasite in said mixture is from about 1 to 10 wt.%.

14. The process of claim 13 wherein said mild hydrocracking conditions include a hydrogen partial pressure ranging between 1,000 to 2,000 psig and a space velocity ranging between ½ to 2½.

15. The process of claim 14 wherein said hydrogenating component ranges from 0.5 to 25 wt.% of said catalyst and is a mixture of Ni and Mo.

16. The process of claim 15 wherein said product has a pour point lower than 5° F.

17. The process of claim 15 wherein said product contains less than about 0.1 wt.% sulfur.

18. The process of claim 10 wherein said feed boils within the range of from about 200° to 900° F.

19. The process of claim 18 wherein said feed has a sulfur content ranging between from about ½ to 2 wt.%.

* * * * *